United States Patent [19]

Kuhnt et al.

[11] Patent Number: 4,828,697
[45] Date of Patent: May 9, 1989

[54] SUCTION FILTER

[75] Inventors: Rainer Kuhnt, Strassdorf; Wolfgang Diemer; Kurt Jakob, both of Waldstetten; Josef Brokhage, Leverkusen, all of Fed. Rep. of Germany

[73] Assignee: Schenk Filterbau GmbH, Fed. Rep. of Germany

[21] Appl. No.: 135,141

[22] Filed: Dec. 18, 1987

[51] Int. Cl.⁴ .................... B01D 23/20; B01D 23/24; B01D 29/38
[52] U.S. Cl. .................................... 210/408; 210/413
[58] Field of Search ................ 210/408, 413, 414, 415

[56] References Cited

U.S. PATENT DOCUMENTS

| | | | |
|---|---|---|---|
| 1,574,557 | 2/1926 | Coe | 210/413 |
| 1,957,303 | 5/1934 | Tietig | 210/408 |
| 3,441,141 | 4/1969 | Zimmermann et al. | 210/408 |
| 3,743,539 | 7/1973 | Kroyer et al. | 127/16 |
| 4,081,381 | 3/1978 | Rosenmund et al. | 210/408 |
| 4,376,705 | 3/1983 | Komura et al. | 210/413 |
| 4,399,042 | 8/1983 | Stannard et al. | 210/408 |
| 4,417,980 | 11/1983 | Baur et al. | 210/91 |
| 4,592,835 | 6/1986 | Grieder et al. | 210/408 |

FOREIGN PATENT DOCUMENTS 1298081  7/1970  Fed. Rep. of Germany .
3136773  4/1982  Fed. Rep. of Germany .
2848109  8/1984  Fed. Rep. of Germany .

Primary Examiner—Richard V. Fisher
Assistant Examiner—Linda S. Evans
Attorney, Agent, or Firm—Welsh & Katz, Ltd.

[57] ABSTRACT

A suction filter for the filtration of particulate matter from fluids has a housing with an inlet opening, a bottom cover, a filter plate lying over the bottom cover, and with a wiper-cutter capable of rotation over the filter plate. The wiper-cutter comprises arms which carry the filter cake into the middle of the filter plate where a central outlet opening is connected to an outlet line in the bottom cover. A valve closes off the outlet line. In the housing or in the outlet line is a vertically adjustable drill, which cuts a hole through the filter cake to permit the cake cut and carried inward by the wiper-cutter arms to fall into the outlet line.

11 Claims, 5 Drawing Sheets

SUCTION FILTER

This invention relates to filters and, more particularly, to a suction filter for the filtration of solid particulate matter suspended in fluids.

BACKGROUND OF THE INVENTION

Suction filters known in the art generally have a discharge opening in the circumferential wall of the filter housing, located above the filter plate. At the discharge opening, after a cake of the particulate matter is formed by filtering, the filter cake is generally cut and pushed to the outside by cutting arms and pushed out through the discharge opening. In such case, the discharge opening should be at least as high as the filter cake height, and relatively large, which may pose problems when the filter housing has a relatively small diameter. Further, the filter housing may be deformed during assembly, so that it is no longer exactly round. Filter cake residues can remain in the container edges in such a case, as the wiping arms will not reach to the edge throughout their sweep when an out-of-round housing is involved. Also, if the container bottom must be joined in a complicated way with the housing, as is generally the case, residues can become stuck between the bottom cover and the housing.

To solve such problems, an outlet opening and line are generally centrally located under the filter plate, i.e., in the longitudinal axis of the filter. In W. German patent No. DE-PS 12 98 081 a suction filter is taught in which the filter cake is carried from the filter plate to the outlet opening by a screw conveyor. However, since the conveyor is open over the discharge line, it must be sealed fluid tight at that point. Since highly corrosive and toxic agents are frequently handled by the filter, the use of expensive materials in the fabrication of the filter construction is mandated to achieve the seal. Also, valuable filtering space for the formation of the filter cake is lost. Furthermore, the screw conveyor is subject to wear and down-time for maintenance, which can become prohibitively expensive.

In the DE-OS 31 36 773, a filtering and drying apparatus is described which has a sealing structure in the outlet line. However, necessary space for the filter cake on the filter plate can be lost to the seal structure. Alternatively, the discharge of the filter cake through the central outlet opening can require a high pressure differential in order to initiate the movement of the cake, which lies as a solid mass over the discharge opening. With this apparatus the discharge of the filter cake is also relatively expensive and unsatisfactory.

SUMMARY OF THE INVENTION

Accordingly, an object of the subject invention is a suction filter having a central discharge of the filter cake, yet having a simple construction without a substantial reduction of the filtering area.

According to the subject invention, this problem is solved by a vertically adjustable boring means, such as a drill, in either the filter housing or outlet which can be extended to reach into the outlet opening, if mounted above the filter cake, or into the upper edge of the filter cake, if mounted below the filter cake. By the subject invention, virtually the entire cross sectional area of the housing is available for filtering. To discharge the filter cake after drying, one simply actuates the drill to open it, drilling through the filter cake at the bore opening. The filter cake is then discharged through the outlet. The drill can be mounted around the wiper-cutter shaft or it can be vertically adjustably mounted in the shaft interior on the wiper-cutter shaft.

With this structure, the shaft for the drill can be easily guided and supported. Relative vertical movement by the wiper-cutter shaft and the drill is necessary, because when first discharging the filter cake, the wiper-cutter shaft with its paddles is situated above or on the surface of the filter cake and a hole must first be cut by the drill. Only then is the wipercutter slowly lowered with rotation to discharge the filter cake.

The drill or the drill shaft can also be fixedly joined radially with the wiper-cutter shaft. A separate drive arrangement for the drill can thus be avoided. The drive arrangement for the wiper-cutter can be used for drilling, although a separate drive is also possible.

The wiper-cutter shaft can be hollow, with the drill shaft for the drill in the interior of the hollow shaft.

The drill shaft for the boring arrangement is supported by a hydraulic vertical drive for the wiper-cutter shaft.

The vertical drive comprises hydraulic cylinders attached to a transverse beam. The wiper-cutter shaft is supported by the transverse shaft. A vertical adjustment system can also be secured to the main transverse beam for vertical positioning of the drill or the drill shaft.

In another form of the invention, the drill, together with its drive system, can be secured in the outlet line, with the drive system being fastened by struts to the interior wall of the outlet line.

The outlet line can have a pipe elbow presenting an opening in the circumferential housing wall, the axis of which is coaxial to the axis of the outlet opening. Through the outlet opening, the drill shaft with the drill may be inserted.

In contrast to the preceding, this drive system is outside the discharge line and can thus be driven in an easier fashion. However, the product does have to be diverted by a pipe elbow and thereby risks a blockage of the filter cake in the elbow.

The wiper-cutter itself may be of any desired type, though it should have arms or blades which are such that the filter cake to be peeled off is carried to the middle of the housing. For this purpose the wiper-cutter can have spiral arms or blades for sweeping in a turning direction to wipe the surface of the filter cake, and in the opposite direction to cut or slice and convey the filter cake to the central outlet opening.

The impedance flow outside the filter vessel may be a simple valve, such as a ball stopcock, which makes a large cross-sectional opening available. A ball stopcock is self-cleaning and thus requires little maintenance.

In the following discussion, examples of the invention are described with the aid of the Figures, from which there will appear further features and advantages according to the subject invention.

DETAILED DESCRIPTION OF THE DRAWINGS

The suction filter, in general, is a construction known to those in the art. Therefore, the following discussion will describe in detail only those parts essential to the invention.

Figure 1:
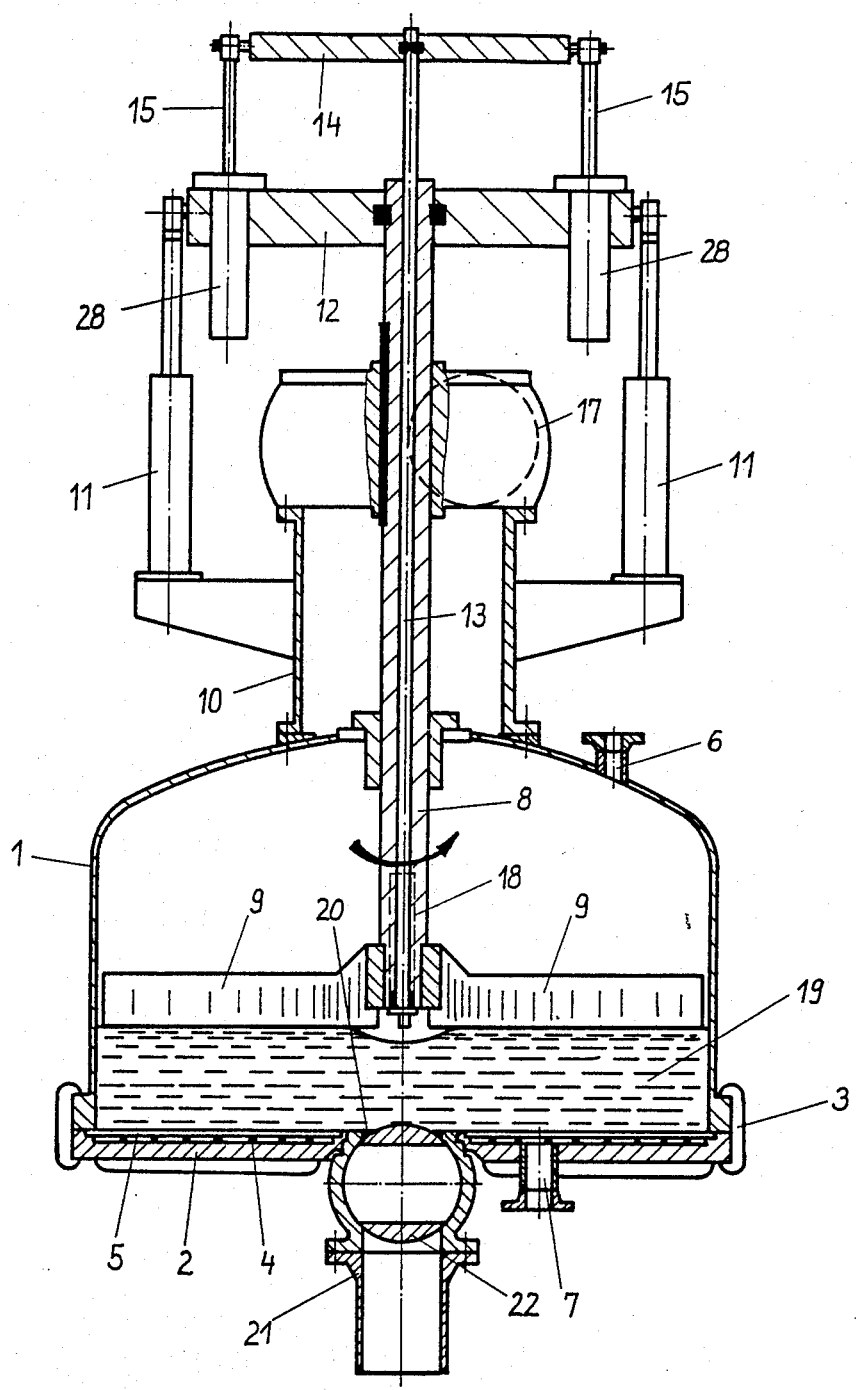
FIG. 1 shows a schematic cross-section of the suction filter of the subject invention with the filter cake on the filter plate.

In one embodiment of the subject invention as shown in FIG. 1, the suction filter has a rotationally symmetrical housing 1, with a lower bottom cover 2, connected, for example, by clamp screws 3, to the housing. Over the bottom cover 2, on spacers 4, is a filter plate 5.

The fluid, having particulate matter in suspension and to be treated, is brought into the housing interior by feed inlet 6. Filtered liquid leaves the housing via a filtrate outlet 7 in the bottom cover 2.

Coaxial to the longitudinal axis of the housing 1 is a drive shaft 8 with transverse beam 9 at the lower end. The agitator shaft 8 is borne and secured in a support frame 10 mounted on the housing 1. Hydraulic cylinders 11 provide vertical adjustment of the shaft 8. The hydraulic cylinders 11 are laterally arranged and joined with one another over a main transverse beam 12.

The shaft 8 for the wiper-cutting means is hollow and in its interior, in one embodiment, is a drill shaft 13, supported at its upper end by a transverse beam 14. The piston rods 15 of hydraulic cylinders 28 engage both sides of the transverse beam 14 and are fastened to or in the transverse beam 12. The wiper-cutter shaft may be set in rotation by a suitable motor 17.

Figure 2:
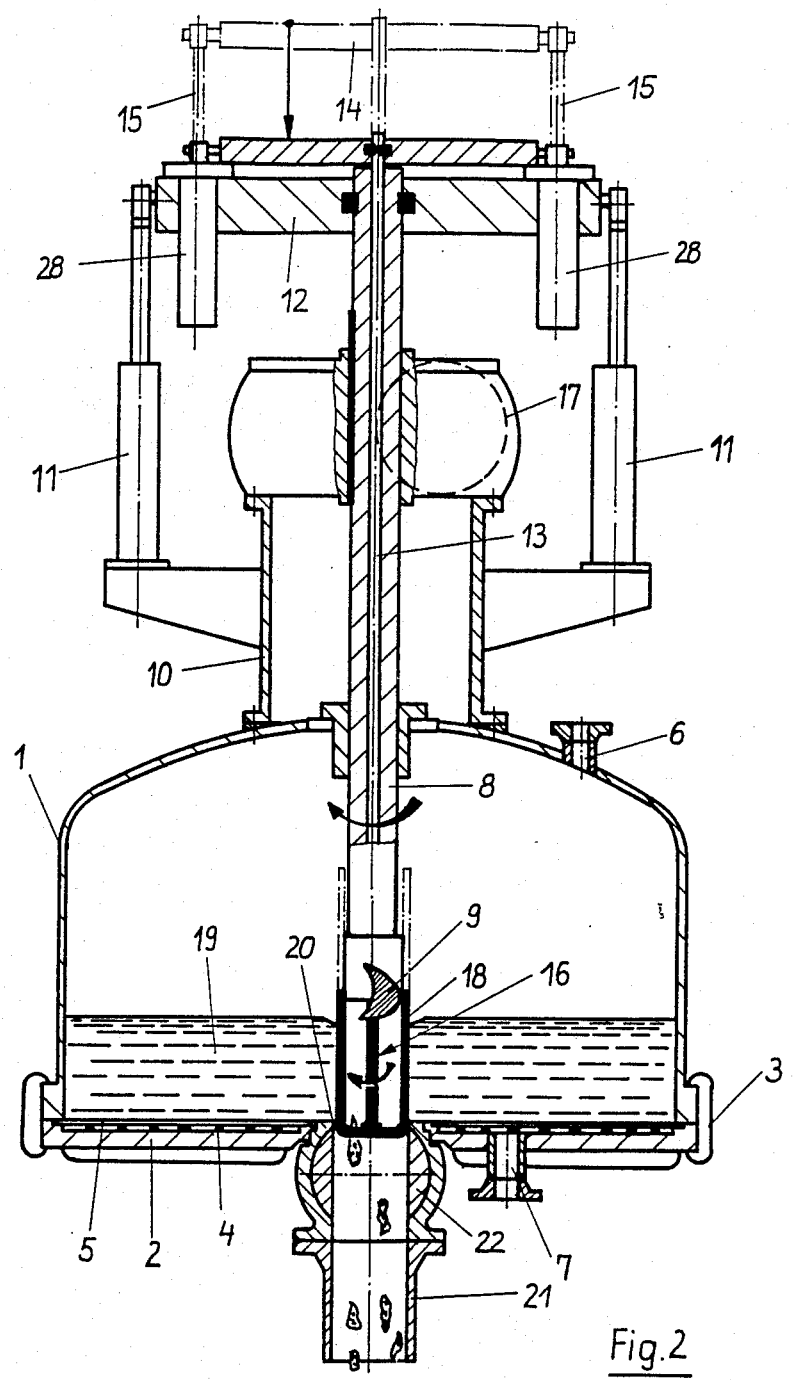
FIG. 2 shows a cross-section of the invention of FIG. 1 showing the discharge of the filter cake.

As seen in FIG. 2, the lower end of the drill shaft 13 carries a drilling apparatus 16 which may be in the form of a bow-shaped drill bit 18. In FIG. 2, the drill bit lies shifted 90° from the wiper-cutter arm 9. For better clarification of the invention, the bow of the drill bit 18 in FIG. 1 is shown in broken lines. In general, however, the shape of the drill bit is arbitrary, so long as it can form an opening of sufficient size in the filter cake 19. Thus, the drill bit should lie coaxial to the longitudinal axis of the filter apparatus and coaxial to a central outlet opening 20 in the bottom cover 2. An outlet line 21 is connected to the central outlet opening and to a valve. The valve 22 can take the form of a ball stopcock, as shown.

The embodiment of the invention set forth in FIGS. 1 to 3 functions in the following manner:

After completion of the material treatment, such as, for example, purification, washing, filtering and drying, a filter cake lies on filter plate 5 at a height of generally 400–500 mm. The height of the filter cake extends generally uniformly over the entire cross section of the housing 1, aided by the wiper-cutter arm which, rotated by the shaft 8, sweeps over and wipes the surface of the filter cake. As shown in FIG. 2, the drill apparatus 16 with the drill bit 18 is lowered, while the shaft 8 continues to rotate. Being integrally connected, the drill bit 18 and drill shaft 13 rotate with the wiper-cutter shaft 8 simultaneously being moved downward by vertical positioning apparatus 28. The radial connection between the drill shaft 13 and the wiper-cutter shaft 8 can be established in any manner known in the art and is here represented by way of example in principle. For this, the shaft 8 has on its underside two stops 29 (see FIG. 3) projecting beyond the circumference of the drill bit 18, which is connected with the drill shaft 13. The rotation of the wiper-cutter shaft 8 causes the drill bit 18 to be rotated. The lowering of the drill shaft 13 and the drill bit 18 is accomplished by the pistons 15 of the hydraulic cylinder 28. In FIG. 2 is shown the position that the drill bit occupies after it has cut a hole through the filter cake 19. During the cutting operation, the wiper-cutter with the wiper-cutter arm 9 remains in its upper position on the filter cake 19. The drill bit 18 can, if need be, be lowered still further into the outlet line 21 or the ball stopcock 22. In this position it will not interfere with the discharge of the cut filter cake parts. During the rotation of the drill bit, the hole can be kept open.

Figure 3:
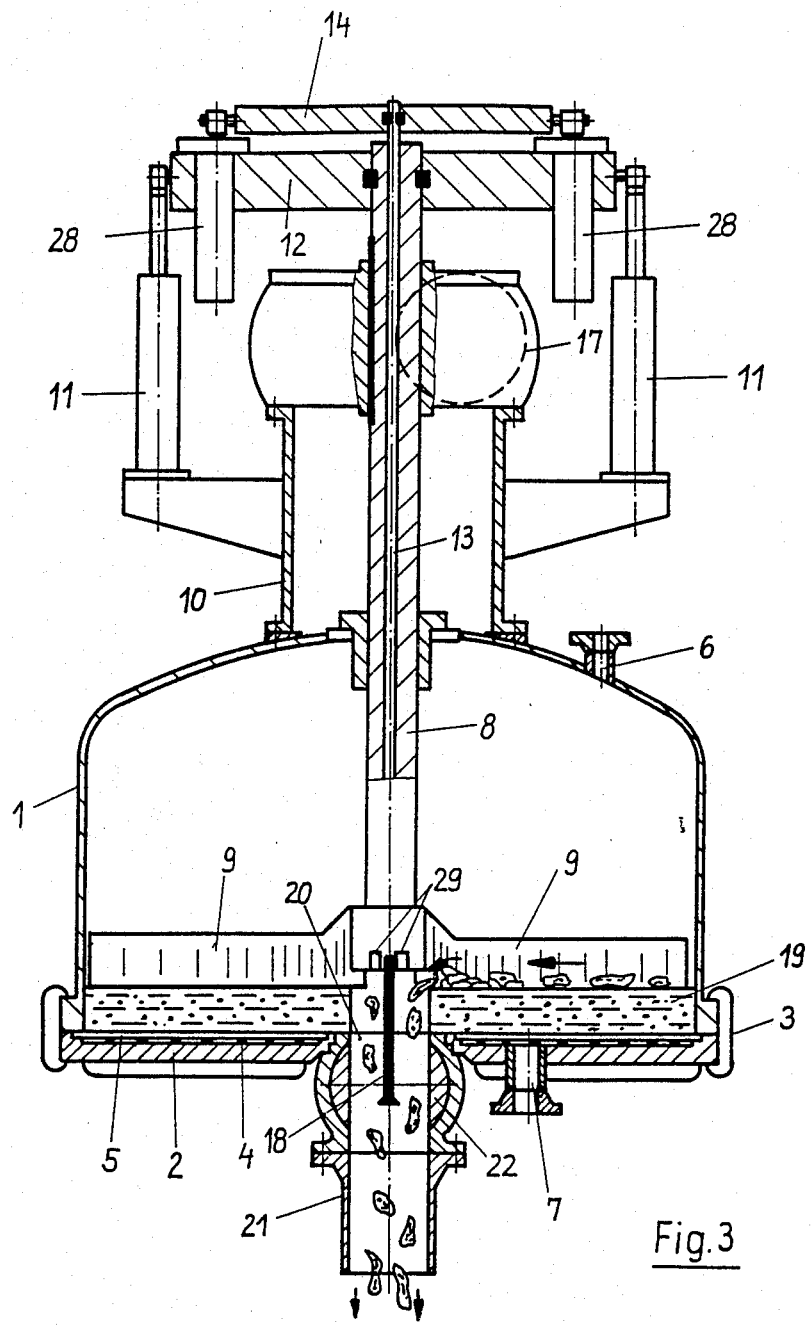
FIG. 3 shows a cross-section of another embodiment of the subject invention showing the discharge of the filter cake.

In FIG. 3, a position of the filter apparatus is shown in which the wiper-cutter with the wiper-cutter arm 9 is partly lowered. By reversing the direction of rotation, the wiper-cutter arm conveys filter cake parts to a central part of the filter assembly, where the filter cake parts fall into the outlet line.

Figure 4:
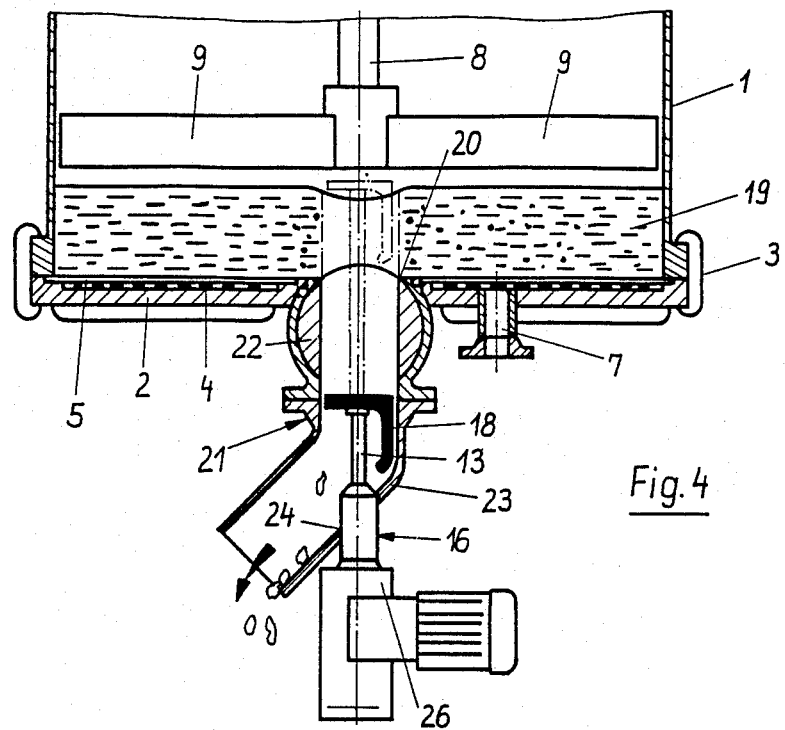
FIG. 4 shows a cross-section of the lower zone of a suction filter of the subject invention showing another drill.

In FIG. 4, an example is shown in which the drilling apparatus 16 with the drill bit 18 has a separate drive. The outlet line 21 has a pipe elbow 23. The pipe elbow 23 has an opening 24 at the circumference of the pipe elbow. The axis of the pipe opening lies coaxial to the axis of the outlet opening 20 and also coaxial to the axis of rotation of the wiper-cutter shaft 8 and to the longitudinal axis of the housing 1. Through the opening 24 the drill shaft 13 for the drill bit 18 is inserted. A drive unit 26 for the drill assembly 16 is located outside the pipe elbow 23. The opening 24 is sealed.

As indicated in broken lines in FIG. 4, the drill shaft 13 for the dirll bit 18 may be thrust axially upward until the drill bit 18 reaches the surface of the filter cake 19 to form a hole in the filter cake 19. The axial drive of the drill shaft 13 can take place in any suitable manner known in the art, such as mechanically, hydraulically, or electrically.

Figure 5:
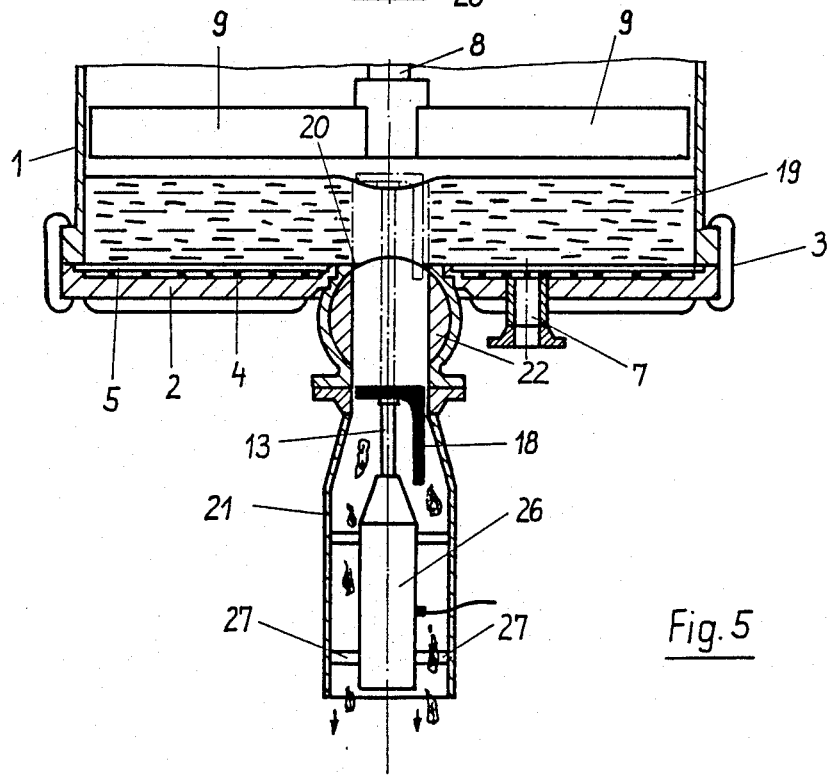
FIG. 5 shows a cross-section of the lower zone of a further embodiment of the suction filter of the subject invention with another alternative drill.

In FIG. 5 there is a further embodiment in which the drive system 26 for the drill bit 18 is ensconced in the interior of the outlet line 21. The drill drive device 26 is fastened to the outlet line 21 by struts 27. The borer shaft 13 is slidable axially upward on the longitudinal axis of the housing 1 with ball stopcock 22 open to form a hole in the filter cake 19.

Figure 6:
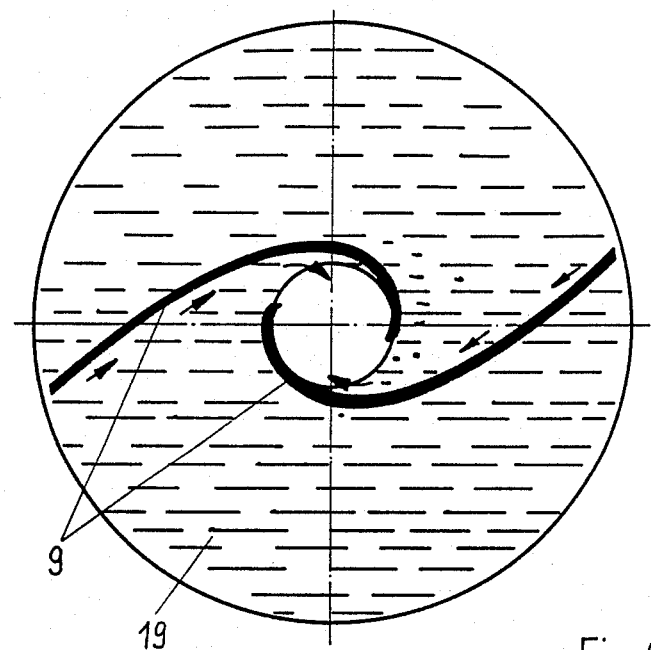
FIG. 6 shows a top plan view of a theoretical representation of the geometry of a wiper-cutter arm of the subject invention.

In FIG. 6 is shown the geometry of the wiper-cutter arms 9. The wiper-cutter arms are in spiral form. Instead of the two individual arm parts shown, there can also be, in a similar spiral form, several more wiper-cutter arms 9. With this spiral form, the cut filter cake parts can be carried inward to the outlet opening.

Figures 7, 8:
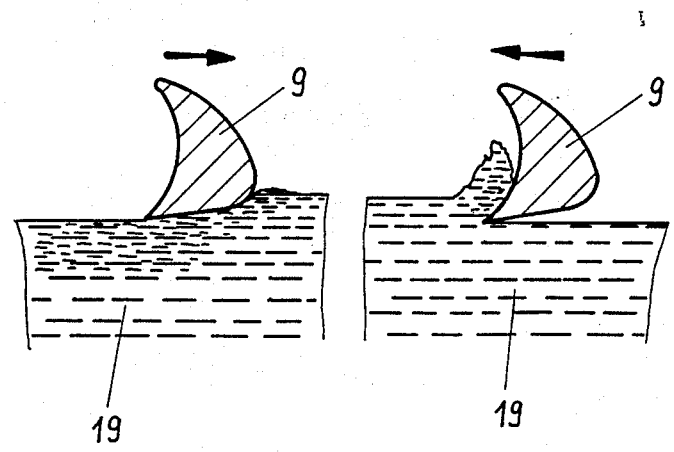
FIG. 7 shows an enlarged cross-section through a wiper-cutter arm of the subject invention in the direction for wiping the surface of a filter cake.
FIG. 8 shows a cross-section through a wiper-cutter arm beam of the subject invention in slicing the filter cake when rotated in a direction opposite to that of FIG. 7.

One possible form of the wiper-cutter arms 9 is represented in FIGS. 7 and 8. In the rotational direction of the wiper-cutter arms in the direction of the arrow as shown in FIG. 7, the filter cake is smoothed. To accomplish this smoothing, the wiper-cutter arms are suitably rounded on one end in this direction of rotation.

When the rotation of the wiper-cutter shaft 8 and thus the wiper-cutter arms 9 is reversed, filter cake parts are cut or sliced off and carried inward in the direction of the central opening. The slicing of the filter cake parts is the result of sharp edges at the end opposite the rounded end.

During the slicing movement the wiper-cutter shaft 8 is continuously incrementally shifted downward, whereby the entire filter cake is eventually cut off and carried out.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments and equivalents falling within the scope of the appended claims.

Various features of the invention are set forth in the following claims.

We claim:

1. A filter apparatus, suitable for the filtration of liquids containing suspended particulate matter, which comprises in combination:
   a. a container vessel having a vessel top, a vessel bottom, a cylindrical vessel sidewall and means defining a feed inlet opening for introducing a liquid to be filtered;
   b. filter means within said container vessel, positioned adjacent said vessel bottom and spaced therefrom;
   c. means defining a filtrate outlet opening in said vessel bottom for removing a filtrate liquid from said container vessel and retaining a filter cake on said filter means;
   d. means defining a solids outlet opening in the center of said vessel bottom and said filter means, for the removal of retained filter cake from said filter means through said vessel bottom;
   e. valve means for opening and closing said solids outlet opening, said valve means having means defining an inlet opening at said filter means, and having means defining an outlet opening below said filter means;
   f. a rotatable adjustable shaft centrally mounted in said vessel top, said shaft having a lower end within said vessel and an upper end exterior of said vessel, and said shaft being adjustable vertically to different elevational positions within said container vessel;
   g. rotational motive means coupled to said rotatable adjustable shaft for rotating said shaft in a first direction and in a reversed second direction;
   h. first vertical adjusting means coupled to said rotatable adjustable shaft for vertically moving said shaft to different elevational positions within said container vessel;
   i. adjustable drilling means mounted on said vessel for drilling a central aperture through retained filter cake in alignment with said solids outlet opening and means for adjusting, said drilling means vertically to different elevational positions within said container vessel; and,
   j. cutter means mounted on the lower end of said rotatable adjustable shaft and extending laterally therefrom to said vessel sidewall, said cutter means having a bottom edge in said first direction for cutting the surface of retained filter cake into particles and passing said particles into said filter cake central aperture when said shaft is rotated in said first direction.

2. The filter apparatus of claim 1 wherein said cutter means comprises an arm in a spiral shape, so that in said second rotational direction, said arm smooths over the surface of the filter cake and in said first rotational direction said arm conveys filter cake particles inwardly to said filter cake central aperture.

3. The filter apparatus of claim 1 wherein said rotatable adjustable shaft contains an axial bore confining a slidable drill shaft, said drill shaft having an upper end extending above the upper end of said rotatable adjustable shaft, said drill shaft having a lower end extending below the lower end of said rotatable adjustable shaft, and wherein said drilling means includes a drill bit mounted on said drill shaft lower end for producing said filter cake central aperture.

4. The filter apparatus of claim 3 wherein said rotatable adjustable shaft comprises means slidably confining said drill shaft so that said drill shaft is rotatable in unison with said rotatable adjustable shaft.

5. The filter apparatus of claim 3 wherein said means for adjusting the drilling means comprises a second vertical adjusting means coupled to the upper end of said drill shaft for slidably moving said drill shaft to different elevational positions within said container vessel independent of the elevational position of said rotatable adjustable shaft.

6. The filter apparatus of claim 5 wherein said first vertical adjusting means comprises hydraulic cylinders mounted externally on said vessel top and joined to each other by a main transverse beam, and said rotatable adjustable shaft upper end is secured to said main transverse beam.

7. The filter apparatus of claim 6 wherein said second vertical adjusting means comprises hydraulic cylinders mounted on said main transverse beam and joined to each other by a secondary transverse beam, and said drill shaft upper end is secured to said secondary transverse beam.

8. The filter apparatus of claim 1 further comprising discharge conduit means mounted on said valve means outlet opening, said discharge conduit means containing a conduit aperture in axial alignment with said solids outlet opening, said adjustable drilling means comprising a rotatable drill shaft with a drill bit mounted on the forward end, and said adjustable drilling means being mounted on said discharge conduit means at said conduit aperture so that said rotatable drill shaft and mounted drill bit are contained within said conduit means with said drill shaft forward end directed toward said valve means outlet opening, so that said adjustable drilling means passes said drill shaft and mounted drill bit through said valve means when in open position and through said filter cake to produce said filter cake central aperture.

9. The filter apparatus of claim 1 further comprising discharge conduit means mounted on said valve means outlet opening, said adjustable drilling means comprising a rotatable drill shaft with a drill bit mounted on the forward end, and said adjustable drilling means being mounted within said discharge conduit means so that said rotatable drill shaft and mounted drill bit are contained within said conduit means in axial alignment with said solids outlet opening, with said drill shaft forward end directed toward said valve means outlet opening, so that said adjustable drilling means passes said drill shaft and mounted drill bit through said valve means when in open position and through said filter cake to produce said filter cake central aperture.

10. The filter apparatus of claim 9 further comprising struts secured to the inner wall of said discharge conduit means for mounting said adjustable drilling means.

11. The filter apparatus of claim 1 wherein said cutter means has a rounded bottom surface in said second direction for smoothing the surface of retained filter cake when said rotatable adjustable shaft is rotated in said second direction.

* * * * *